8792X
E. Nott,
Range.
Patented Apr. 22. 1835.
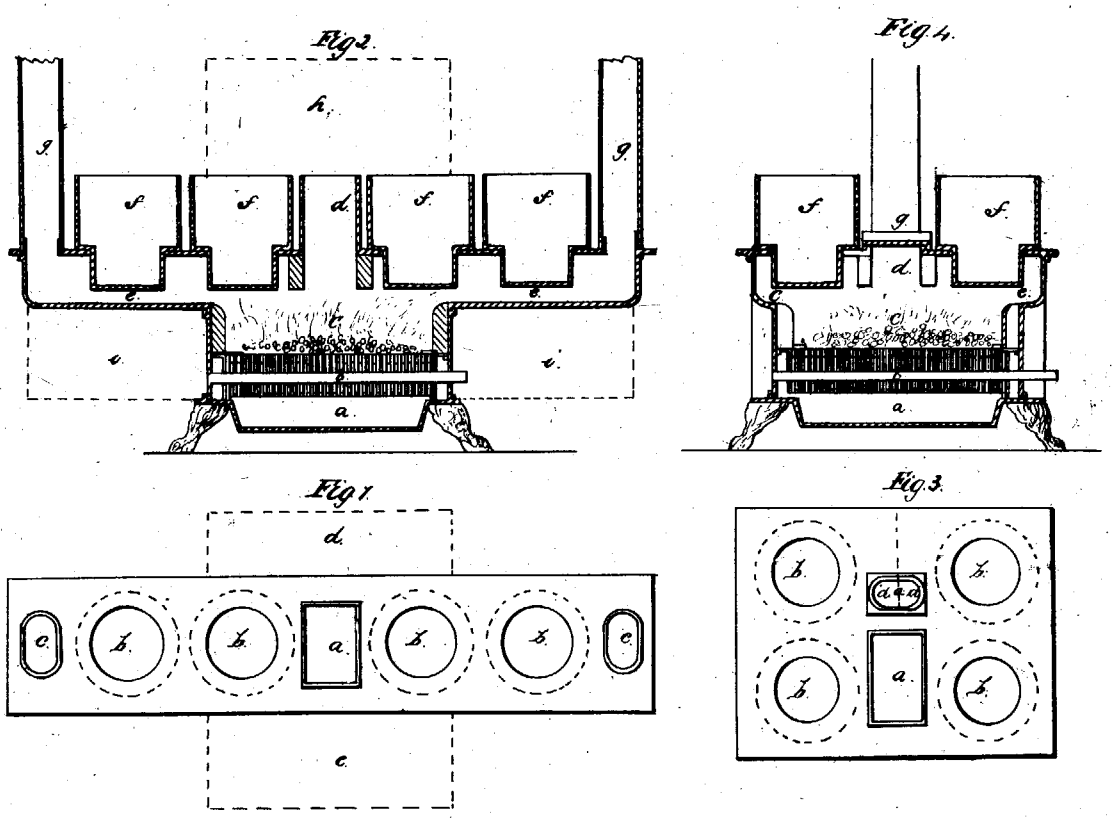

Apl 22. 1835

Eliphalet Nott)

8192X

Letters Patent.

The Schedule referred to in these Letters Patent and making part
of same, containing a description in the words of the said Elipha-
let Nott himself of his improvement in Kitchen Ranges both
fixed and moveable; for the purpose of facilitating the use
of anthracite coal therein 1. In combining a chamber of combustion, chiefly in noncon=
ducting material, with a central tower for preparing and sup=
plying fuel, called the feeder, and with two separate kettle flues one
on each side thereof; the same usually lined with nonconducting ma-
terial, and extended horizontally beyond said chamber, overhang
=ing the ends and connecting at their extremities with outlets governed
by valves so that the flame can be directed in either chamber or in
both at pleasure - the whole capable of being adjusted permanently
in the fire place, and called for distinction sake, the Fixed
Range. or of being placed temporarily in any part of the room and
called for distinction sake, the Moveable Range - 2. In combining a
the ends of the chamber of combustion, under the overhanging
kettle flues in the fixed Range, fixed tin or other reflecting ovens,
to be heated solely, if desired, from the bottom of the overhang=
ing flues, and the ends of the chamber of combustion
3. In combining with each of said fixed ovens, a reflector, that is,
a separate brass or other reflecting bottom so inclined as to increase
the upward reflection more or less if desired. 4. In combining
with each of said fixed ovens a Radiator, that is, a Metallic
section of siding, situated at or near the bottom of the chamber of com
bustion, of such size and thickness and so connected with the brick
or other nonconducting section of siding, as to insure the transmission
of sufficient heat to the oven, for baking the bottom of the articles
con-contained therein; which Radiator may be either a mere metal
lic plate, or a plate perforated like a honey comb with small holes
to be filled with clay or or other non conducting material. (5.) In com=
bining also, if desired, on the back of the chamber of combustion,
in said fixed range, an upward Reflecting oven, that is, an oven,
commencing at or near the bottom of the chamber of combustion
and rising so much above the same as to be accessible by doors in
said chamber, for placing things on a middle plate or shelf,
at or near the level of the top of said chamber, after the manner of
the ovens in kitchen ranges already in use; but constructed of
tin or other reflecting material in place of iron and heated by
means of a Radiator, situated in the back of the chamber of com=
bustion, in connection with the bottom back and ends of the oven
itself — the whole bottom and siding being adjusted in such re=
lative angular positions, as to throw the greatest practicable amount
of heat up against the shelf or middle plate aforesaid, on which
the contained articles are placed. (6.) In combining with the chamber
of combustion in the Fixed Range, either a close front, an open
grated front, or a transparent front and reciprocating flues as in
use in Nott's patent parlour or hall stoves. (7.) In combining with
said front of whichever kind, in said fixed range, an exterior moveable
front bake oven, roaster, or other culinary instrument, in tin or other re=
flecting material, the same having if desired, apertures governed by valves
on the upper or under side or on both, for the admission of air when necessa
ry for regulating the temperature or improving the flavour; which
combination may be effected by adapting to each other the front
of said furnace and the face of said instruments in size structure
and form, so as to make when combined, a regular fit, and by con=
necting the same by hanging the latter against the former, like doors
so as to open and shut, and ship and unship; or by providing for
connecting the same by means of rollers, ways, hitches, hooks or any
other fixture preferred. (8.) In combining with the Moveable Range,
removeable bake ovens, roasters or other culinary instruments
in tin on tin or other reflecting materials, by hanging the same on the sides
of the chamber of combustion [illegible] the doors in such manner as to open
and shut and slip and overlap; or by otherwise adjusting the same
thereat, by means of rollers, hatches, hooks or any other fixtures pre-
ferred. (9) In projecting the kettle flues, in the Moveable Range, on
the back in place of the sides of the chamber of combustion, if desired;
and in combining therewith a fixed oven of the same material, or
having the same fixtures, and to be heated in the same manner as
the ovens combined on the sides of the chamber of combustion in the
Fixed Range aforesaid. (10) In combining with the chamber of com-
bustion in the Moveable Range, a close front, an open front, a
grated front or a transparent front and reciprocating flue after
the manner of E. Notts patent stoves aforesaid, as preferred; and
in dispensing with the kettle flue on one side of the central tower
if desired. (11) in combining in said Range, whether fixed or mo-
veable the rotary flat or cylindric grate in any of its forms
as heretofore made use of in E. Notts patent stoves; or in dispensing
with a bottom grate altogether, and substituting (in place thereof) a
mere close slide, drop or rotary floor, for emptying out residuum;
the air being passed to the fire through the reciprocator aforesaid.
For further information reference may be had to the drawings
and explanations connected herewith.—
Claim.— I claim as my invention the several improvements on
existing cooking ranges, set forth in the foregoing several com-
binations.— together with the uses to which the same has been or
may hereafter be applied.

Witnesses
C. M. Jones.
M. B. Young.

Eliphalet Nott (1044 Words)

(Drawing)

(Granted 22nd April 1835)